United States Patent
Mo et al.

(10) Patent No.: US 11,438,530 B2
(45) Date of Patent: Sep. 6, 2022

(54) PIXEL UNIT WITH A DESIGN FOR HALF ROW READING, AN IMAGING APPARATUS INCLUDING THE SAME, AND AN IMAGING METHOD THEREOF

(71) Applicant: SmartSens Technology (HK) Co., Ltd., Kwun Tong Kowloon (HK)

(72) Inventors: Yaowu Mo, Shanghai (CN); Chen Xu, Santa Clara, CA (US); Zexu Shao, Shanghai (CN); Weijan Ma, Shanghai (CN); Guanjing Ren, Shanghai (CN); Wenjie Shi, Shanghai (CN); Xiao Xie, Shanghai (CN)

(73) Assignee: SmartSens Technology (HK) Co., Ltd., Kowloon (HK)

( * ) Notice: Subject to any disclaimer, the term of this patent is extended or adjusted under 35 U.S.C. 154(b) by 0 days.

(21) Appl. No.: 17/502,209

(22) Filed: Oct. 15, 2021

(65) Prior Publication Data
US 2022/0060644 A1    Feb. 24, 2022

Related U.S. Application Data

(62) Division of application No. 16/223,104, filed on Dec. 17, 2018, now Pat. No. 11,317,038.

(30) Foreign Application Priority Data

Dec. 19, 2017  (CN) .......................... 201711376060.3
Dec. 19, 2017  (CN) .......................... 201711378350.1

(51) Int. Cl.
*H04N 5/345*    (2011.01)
*H04N 5/3745*   (2011.01)
*H04N 5/376*    (2011.01)
*H04N 5/378*    (2011.01)

(52) U.S. Cl.
CPC .......... *H04N 5/345* (2013.01); *H04N 5/3452* (2013.01); *H04N 5/376* (2013.01); *H04N 5/378* (2013.01); *H04N 5/37455* (2013.01)

(58) Field of Classification Search
CPC .. H04N 5/345; H04N 5/3452; H04N 5/37455; H04N 5/376; H04N 5/378
See application file for complete search history.

(56) References Cited

U.S. PATENT DOCUMENTS

| | | | |
|---|---|---|---|
| 2015/0070544 A1* | 3/2015 | Smith | ............... H01L 27/14641 348/297 |
| 2015/0163430 A1 | 6/2015 | Kanemitsu et al. | |
| 2016/0142645 A1 | 5/2016 | Shionoya et al. | |

(Continued)

*Primary Examiner* — Christopher K Peterson
(74) *Attorney, Agent, or Firm* — Eric Karich; Karich & Associates

(57) ABSTRACT

Disclosed are a pixel unit, and an imaging method and apparatus thereof. The pixel has a first and a second pixel sub-portion each comprising one or more photodiodes; one or more transfer transistors each coupled to a floating diffusion, for transferring the charges generated by the one or more photodiodes in response to incident light during an exposure period and accumulated in the photodiode during said exposure period respectively to the floating diffusion; a reset transistor; and a source follower transistor coupled to the floating diffusion for amplifying and outputting the pixel signal of the floating diffusion. In some embodiments, the pixel further includes a capacitor and a gain control transistor.

18 Claims, 13 Drawing Sheets

(56) References Cited

U.S. PATENT DOCUMENTS

2018/0115730 A1* 4/2018 Velichko ........... H01L 27/14641
2022/0116557 A1* 4/2022 Lee ..................... H04N 5/3559
2022/0157868 A1* 5/2022 Kono ................ H01L 27/14645

* cited by examiner

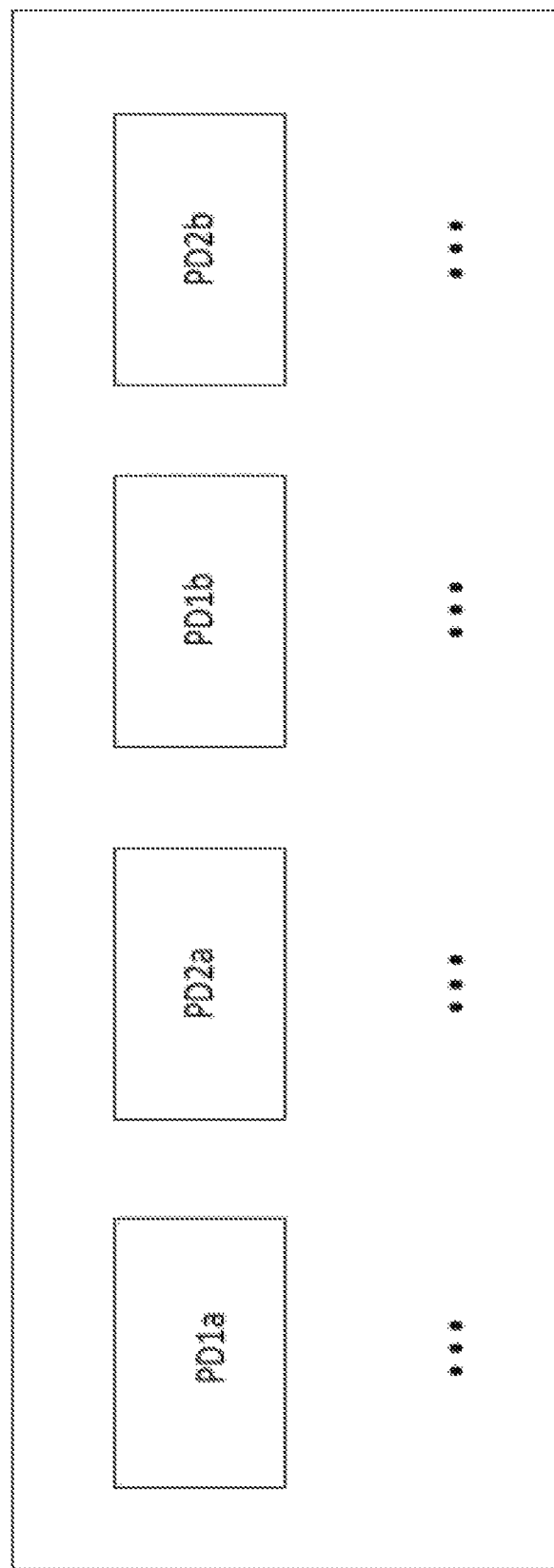

PIXEL UNIT WITH A DESIGN FOR HALF ROW READING, AN IMAGING APPARATUS INCLUDING THE SAME, AND AN IMAGING METHOD THEREOF

CROSS-REFERENCE TO RELATED APPLICATIONS

This application for a utility patent is a division of a previously filed utility patent, having the application Ser. No. 16/223,104, filed Dec. 17, 2018.

This application claims benefit of priority under the Paris Convention based on Chinese Application No. 201711376060.3 filed on Dec. 19, 2017, Chinese Application No. 201810130554.1 filed on Feb. 8, 2018, and Chinese Application No. 201711378350.1 filed on Dec. 19, 2017, and the entire disclosures of the above three applications are incorporated herein by reference.

BACKGROUND OF THE INVENTION

Field of the Invention

The present invention relates to the field of imaging, particularly relates to a pixel unit with a design for half row reading, an imaging apparatus including the same, and an imaging method thereof The present invention can find applications in a computer, a camera, a scanner, a machine vision, a Vehicle navigator, a video phone, a surveillance system, an automatic focusing system, a star tracker system, a motion detection system, an image stabilization system and data compression system, among others.

Description of Related Art

Demands for image qualities have been continually increasing. In particular, current imaging research and development have contributed many efforts to obtain a high-quality image without the aid of hardware with complex structure. For example, a high quality picture having a high resolution is required on a portable imaging apparatus such as a card like camera.

An imaging apparatus typically has an array of pixels. Each pixel in the pixel array comprises a photosensitive device, such as a photodiode, a light switch and the like. The photosensitive capability is determined by the photosensitive area of a photosensitive device.

Many efforts have been contributed to increase the photosensitive area in an imaging apparatus in the art.

Advantageously, the present invention meets many of the needs existed in the prior art, and exhibits numerous technical merits such as simplified pixel peripheral control circuit structure, and reduced chip area, reduced power consumption, among others.

SUMMARY OF THE INVENTION

The present invention teaches certain benefits in construction and use which give rise to the objectives described below.

One aspect of the present invention provides a pixel unit comprising a first pixel sub-portion and a second pixel sub-portion each for half row reading. The first pixel sub-portion and second pixel sub-portion each comprises one or more photodiodes; one or more transfer transistors each coupled to a floating diffusion, for transferring the charges generated by the one or more photodiodes in response to incident light during an exposure period and accumulated in the photodiodes during said exposure period respectively to the floating diffusion; a reset transistor, and a source follower transistor coupled to the floating diffusion for amplifying and outputting the pixel signal of the floating diffusion In a first group of embodiments, the reset transistor is directly coupled to the floating diffusion region, for resetting the level of the floating diffusion region based on a reset control signal. In a second group of embodiments, the pixel unit further comprises a capacitor and a gain control transistor, which the first group of embodiments does not have. A first end of the capacitor is coupled to a specified voltage, and the gain control transistor is coupled between a second end of the capacitor and the floating diffusion for imposing an isolation control between the capacitor and the floating diffusion. The reset transistor is coupled to the capacitor and the gain control transistor for resetting the voltages of the capacitor and a coupling point with the gain control transistor by controlling a signal.

Moreover, the reset transistor is not directly coupled to the floating diffusion in these embodiments.

Another aspect of the invention provides an imaging apparatus that comprises a pixel array comprising a plurality of the above pixel units arranged in rows and columns, and a control circuit for controlling the pixel array. Still another aspect of the invention provides an imaging method using the pixel units as described above.

The above features and advantages and other features and advantages of the present invention are readily apparent from the following detailed description of the best modes for carrying out the invention when taken in connection with the accompanying drawings.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale, well-known structures and devices are shown in simplified form in order to avoid unnecessarily obscuring the present invention. Other parts may be omitted or merely suggested.

FIG. 7b is a schematic diagram of a pixel array structure according to an embodiment of the present invention;

DETAILED DESCRIPTION OF THE INVENTION

Figure 1:
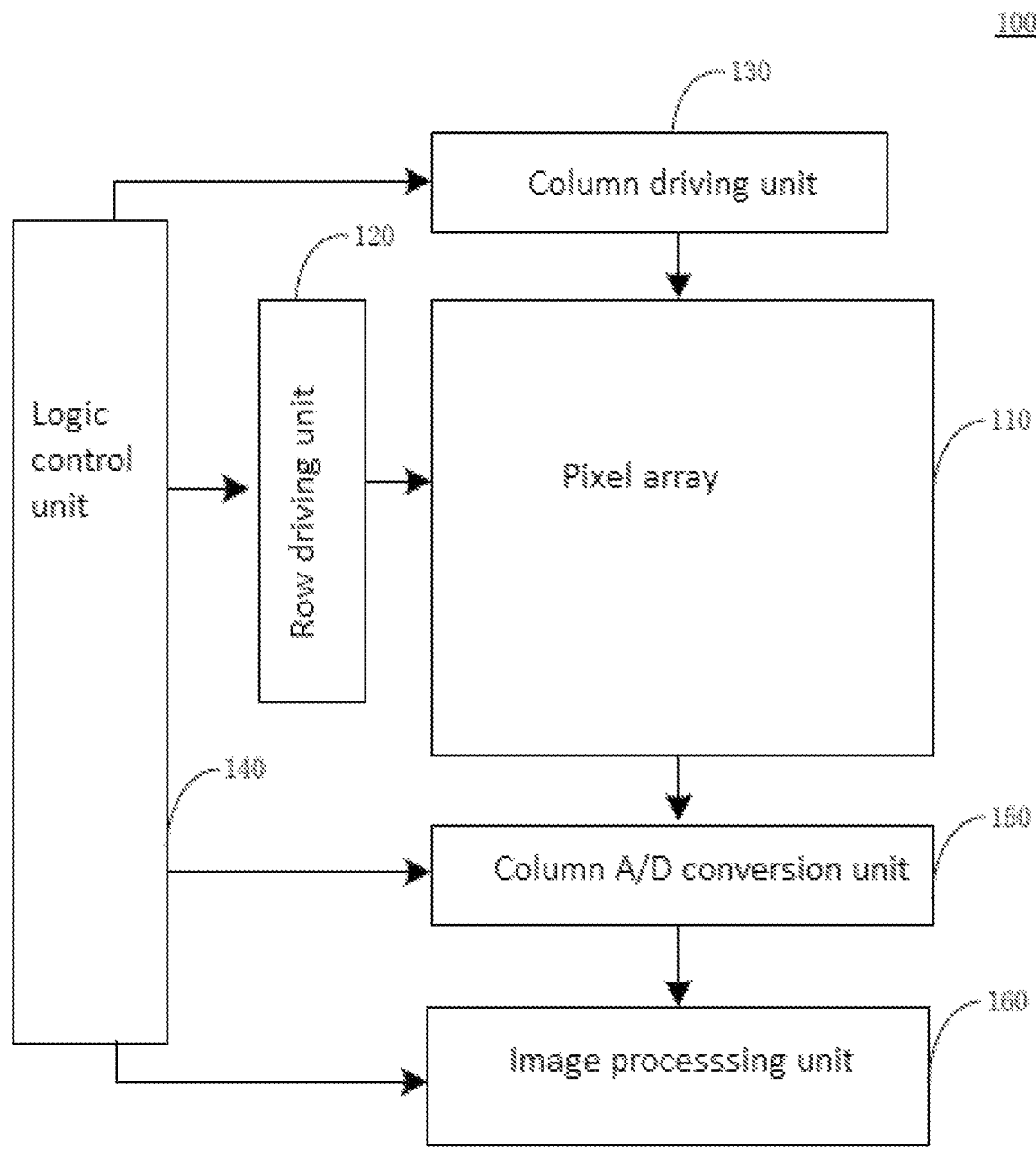
FIG. 1 is a schematic diagram of the structure of an imaging apparatus according to one embodiment of the present invention.

In order to make the purposes, the technical solution and advantages of the embodiment of the present invention in the following with reference to the accompanying drawings in the embodiments clearer, the technical solutions in the embodiments of the present invention are clearly and completely described of the present invention. Apparently, the described embodiments are only a part, but not all, of the embodiments of the invention. All other embodiments obtained by those of ordinary skill in the art based on the embodiments of the present invention without creative efforts are within the scope of the present invention.

In the following detailed description, reference can be made to each of the drawings which are a part of the present application and are for explaining particular embodiments of the present application. In the drawings, like reference numbers in different drawings describe substantially similar components. Each particular embodiment of the present application is described below with sufficient details, so that those of ordinary skill having knowledge and techniques relevant to the art can practice the technical solutions of the present application. It should be understood that it is also possible to use other embodiments to modify the structural, logical or electrical properties of the embodiments of the present application.

To solve the problems in the prior art, and according to the first group of embodiments, there is proposed an imaging apparatus comprising: a pixel array comprising a plurality of pixels arranged in rows and columns, wherein at least one pixel comprises a first pixel sub-portion and a second pixel sub-portion for half row reading; wherein, the first and second pixel sub-portion each comprises: a photodiode; a transfer transistor which is controlled to transfer the charges of the photodiode generated in response to incident light during an exposure period and accumulated in the photodiode during said exposure period to a floating diffusion; a reset transistor which is coupled to the floating diffusion and is controlled to reset the level of the floating diffusion based on a reset signal; and a source follower transistor which is coupled to the floating diffusion. The reset transistors of the first pixel sub-portion and the second pixel sub-portion share the reset signal. The imaging apparatus further comprises a control circuit for controlling the pixel array.

In the imaging apparatus as described above, wherein, the first and the second pixel sub-portions each comprise a row select transistor; the respect row select transistor of the first pixel sub-portion and the second pixel sub-portion share the row select control signal in the imaging apparatus as described above, wherein, the first pixel sub-portion and second pixel sub-portion are coupled to the same column A/D conversion unit. In the imaging apparatus as described above, wherein the first and second pixel sub-portion each comprise multiple photodiodes and multiple transfer transistors.

According to another aspect of the first group of embodiments, there is proposed a pixel unit comprising a first pixel sub-portion comprising a first photodiode; a first transfer transistor which is controlled to transfer the charges generated by the first photodiode in response to incident light during an exposure period and accumulated in the photodiode during said exposure period to a first floating diffusion; a first reset transistor which is coupled to the first floating diffusion and is controlled to reset the level of the first floating diffusion based on a reset signal; and a first source follower transistor coupled to the floating diffusion; and a second pixel sub-portion comprising a second photodiode; a second transfer transistor which is controlled to transfer the charges generated by the second photodiode in response to incident light during an exposure period and accumulated in the photodiode during said exposure period to a second floating diffusion: a second reset transistor which is coupled to the second floating diffusion and is controlled to reset the level of the second floating diffusion based on a reset signal, and a second source follower transistor coupled to the floating diffusion; wherein, the first reset transistor and the second reset transistor share the reset signal.

In an embodiment of the pixel as described above, the first pixel sub-portion comprises a first row select transistor which is coupled to the first source follower transistor; a second pixel sub-portion comprises a second row select transistor which is coupled to the second source follower transistor, wherein, the first row select transistor and the second row select transistor share the row select control signal. In an embodiment of the pixel as described above, the output signals of the first and the second pixel sub-portions are respectively coupled to the same column A/D conversion unit. In an embodiment of the pixel as described above, the first pixel sub-portion and the second pixel sub-portion each comprise multiple photodiodes and multiple transfer transistors In an embodiment of the pixel as described above, the first pixel sub-portion and the second pixel sub-portion are respectively coupled to different column A/D conversion unit.

According to another aspect of the first group of embodiments, there is proposed an imaging method in the above imaging apparatus or pixel, comprising: obtaining a first reset voltage from the floating diffusion of the first pixel sub-portion; obtaining a first signal voltage from the floating diffusion of the first pixel sub-portion; determining a first pixel signal based on the first reset voltage; obtaining a second reset voltage from the floating diffusion of the second pixel sub-portion; obtaining a second signal voltage from the floating diffusion of the second pixel sub-portion; determining a second pixel signal based on the second reset voltage.

An embodiment of the method as described above further comprises: conducting a digital to analog conversion for the first pixel signal and. the second pixel signal on the same column A/D conversion unit. According to the above disclosures of the present invention, the peripheral control circuit design structure can be reduced, and the area of the chip can be effectively reduced while reducing the power consumption of the circuit by adopting the circuit structure of even column pixel output and odd column pixel output.

The term "pixel unit" or "pixel" in the present invention refers to an electrical element containing a photosensitive device or other devices for transmitting electromagnetic signals to electrical signals. For the purposes of illustration, FIG. 1 shows a schematic diagram of the structure of a representative imaging apparatus comprising an array of pixels.

The imaging apparatus 100 as shown in FIG. 1, for example a CMOS imaging apparatus, comprises a pixel array 110. The pixel array 110 comprises a plurality of pixels arranged in rows and columns.

Each column of pixels in the pixel array 110 is selectively turned on by column select lines, and each row of pixels is selectively output by row select lines respectively. Specifically, each pixel comprises a first portion in even column and a second portion in odd column. When this pixel is being read, the two portions are read respectively. Logic control unit 140 performs logical control on each functional unit, Row driving unit 120 and column driving unit 130 respectively control the pixel rows and columns read from the first pixel sub-portion and second pixel sub-portion. The pixels read from the first pixel sub-portion and second pixel sub-portion share the same column A/D conversion unit 150. The pixel information output from the column A/D conversion unit 150 is transferred to an image processing unit 160 for signal processing, and then outputting image information.

Figure 2:
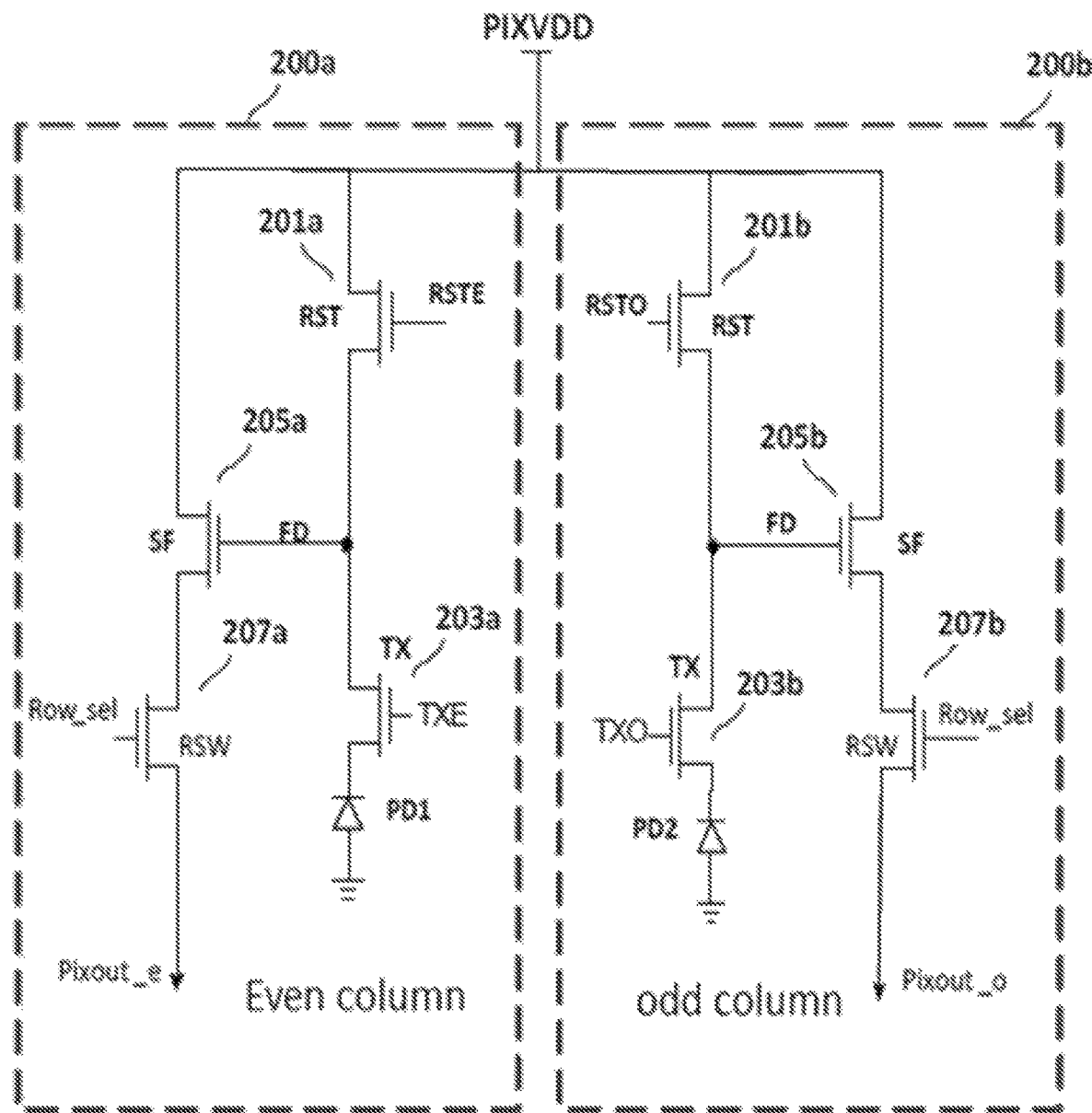
FIG. 2 is a schematic diagram of a pixel unit circuit in accordance with the first embodiment of the present invention.

FIG. 2 is a schematic diagram of a pixel unit according to one example in the first group of embodiments. Pixel 200 in FIG. 2 comprises (or consists of) a first pixel sub-portion 200a and a second pixel sub-portion 200b (having the same or symmetrical circuit structure as 200a) and located in even column and odd column respectively. The first pixel sub-portion 200a located in even column will be described below, and the detailed description of sub-portion 200b will be omitted for simplicity.

Figure 3:
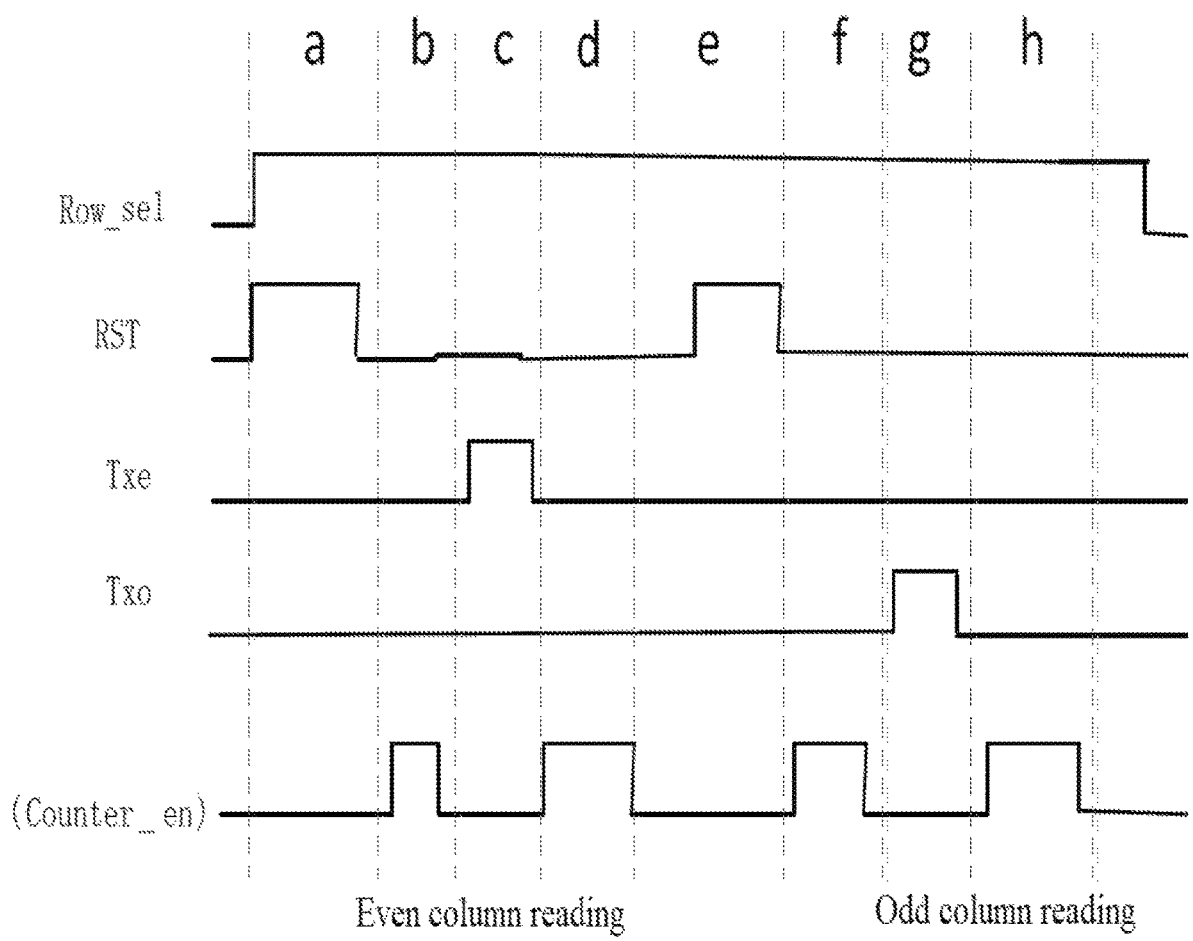
FIG. 3 is a pixel read control timing schematic diagram in accordance with the first embodiment of the present invention.

As shown in FIG. 2, the first pixel sub-portion 200a located in even column comprises (or consists of) a reset transistor 201a, a transfer transistor 203a, a photodiode PD1, a source follower transistor 205a, and a row select transistor 207a. The photodiode PD1 is connected to the source of the transfer transistor 203a. Reference is made to the pixel read timing diagram of the first embodiment of the present invention provided in FIG. 3. The row select control signal Row_sel is set at a high level and the row select transistor 207a is connected. The reset signal RSTE is set at a high level, and the reset transistor 201a is connected, the level of the floating diffusion FD is reset to PIXVDD. The reset signal RSTE is set at a low level and the reset transistor 201a is off. The level of the floating diffusion FD PIXVDD is signal-amplified by the source follower transistor 205a, via the row select transistor 207a output reset voltage Ve0. The control signal TXE of the transfer transistor 203a is set at a high level, transfer transistor 203a is connected, the electrons generated in photodiode PD1 are transferred to the floating diffusion FD via the transfer transistor 203a; the control end of the transfer transistor 203a is set at a low level, the transfer transistor 203a is off, the source follower transistor 205a amplifies the signal of the floating diffusion FD via the row select transistor 207a output voltage signal value Ve1. The difference between the reset voltage Ve0 and the output voltage signal value Ve1 is the pixel signal of the signal output pixout_e at the even column pixel of the first pixel sub-portion.

In the present embodiment, the structure of the second pixel sub-portion 200b located in odd column is similar to the first pixel sub-portion 200a, and thus the description for the process of reading pixout_o in the odd column is omitted.

In the image sensor circuit shown in FIG. 2, the row select transistor 207a and the row select transistor 207b share the same row select control signal. The reset transistor 201a and the reset transistor 201b share the same reset signal. In the present embodiment, the outputs of the first pixel sub-portion and the second pixel sub-portion respectively output pixel signals by the row select transistor 207a and 207b. In an embodiment, the pixel signal may output pixel signals directly from the source follower transistor 205a and 205b, but not by the select transistor.

According to one example in the first group of embodiments, the output of the first pixel sub-portion 200a and the second pixel sub-portion 200b are coupled to the same column A/D conversion unit.

Figure 4:
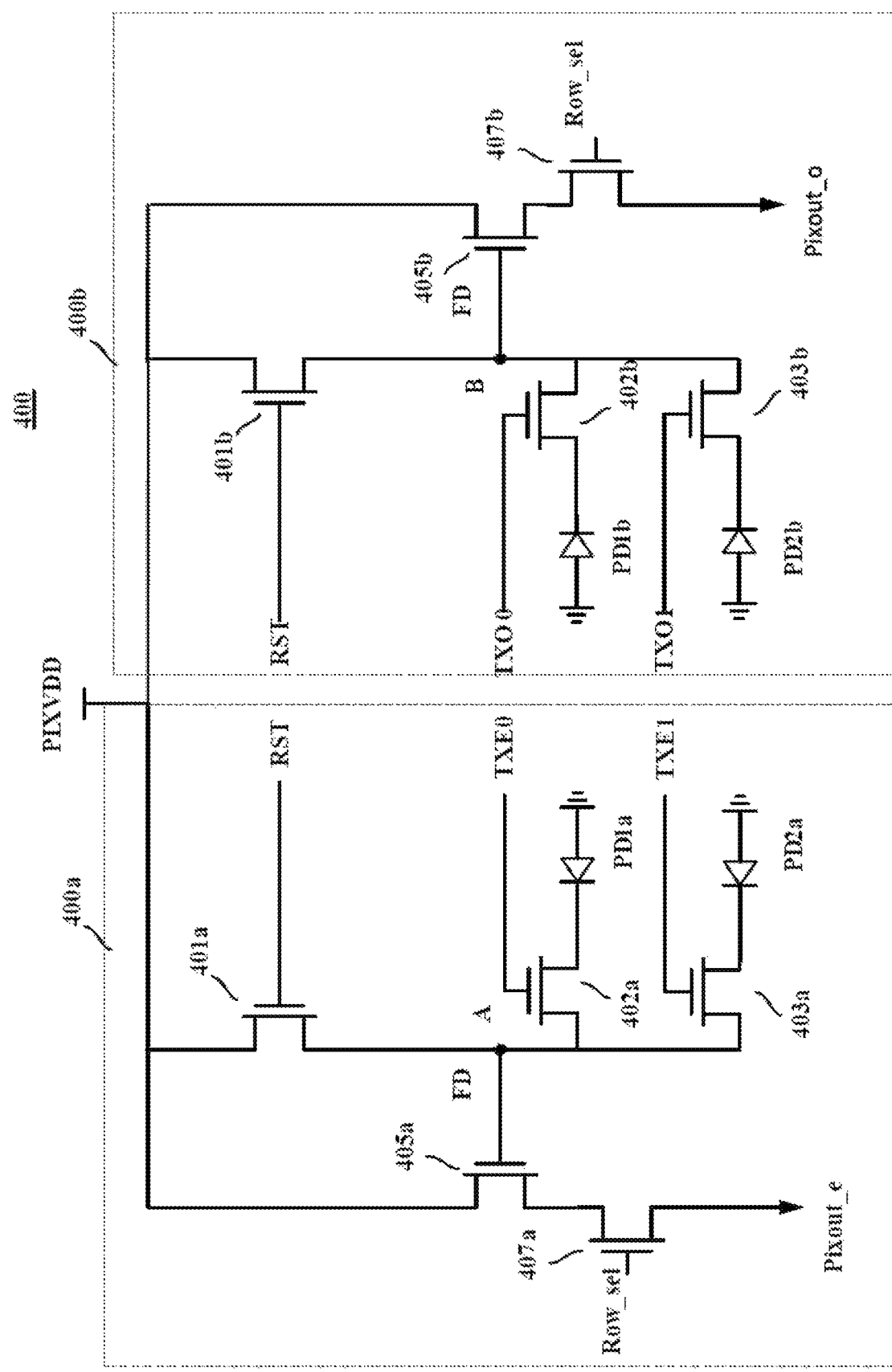
FIG. 4 is a schematic diagram of a pixel unit circuit in accordance with the second embodiment of the present invention.

FIG. 4 is a schematic diagram of a pixel unit circuit based on another example in the first group of embodiments. An image sensitive apparatus 400 comprises a first pixel sub-portion 400a and a second pixel sub-portion 400b having the same circuit structure, respectively located in even columns and odd columns.

As shown in FIG. 4, the first pixel sub-portion 400a comprises (or consists of) a first photodiode PD1a and a first transfer transistor 402a coupled to the first photodiode PD1a; a second photodiode PD2a and a second transfer transistor 403a coupled to the second photodiode PD2a. The first transfer transistor 402a and the second transfer transistor 403a are commonly coupled to the same floating diffusion FD. This. part of the circuit structure shares one reset transistor 401a, one source follower transistor 405a, and one row select transistor 407a. In a different embodiment, the row select transistor 407a is omitted and pixel signals are output directly from the source follower transistor 405a. For the particular implementation process of the circuit, reference could be made to the embodiment a shown in FIG. 2, so the description thereof is omitted.

In the circuit structure shown in FIG. 4, the pixels output from the first pixel sub-portion 400a share the same column A/D conversion unit, and the pixels output from the second pixel sub-portion 400b share the same column A/D conversion unit. According to the first group of embodiments, the circuit design of the control circuit portion in a pixel unit circuit can be reduced, thereby reducing the designed circuit power consumption and significantly reducing the chip area.

Figure 5:
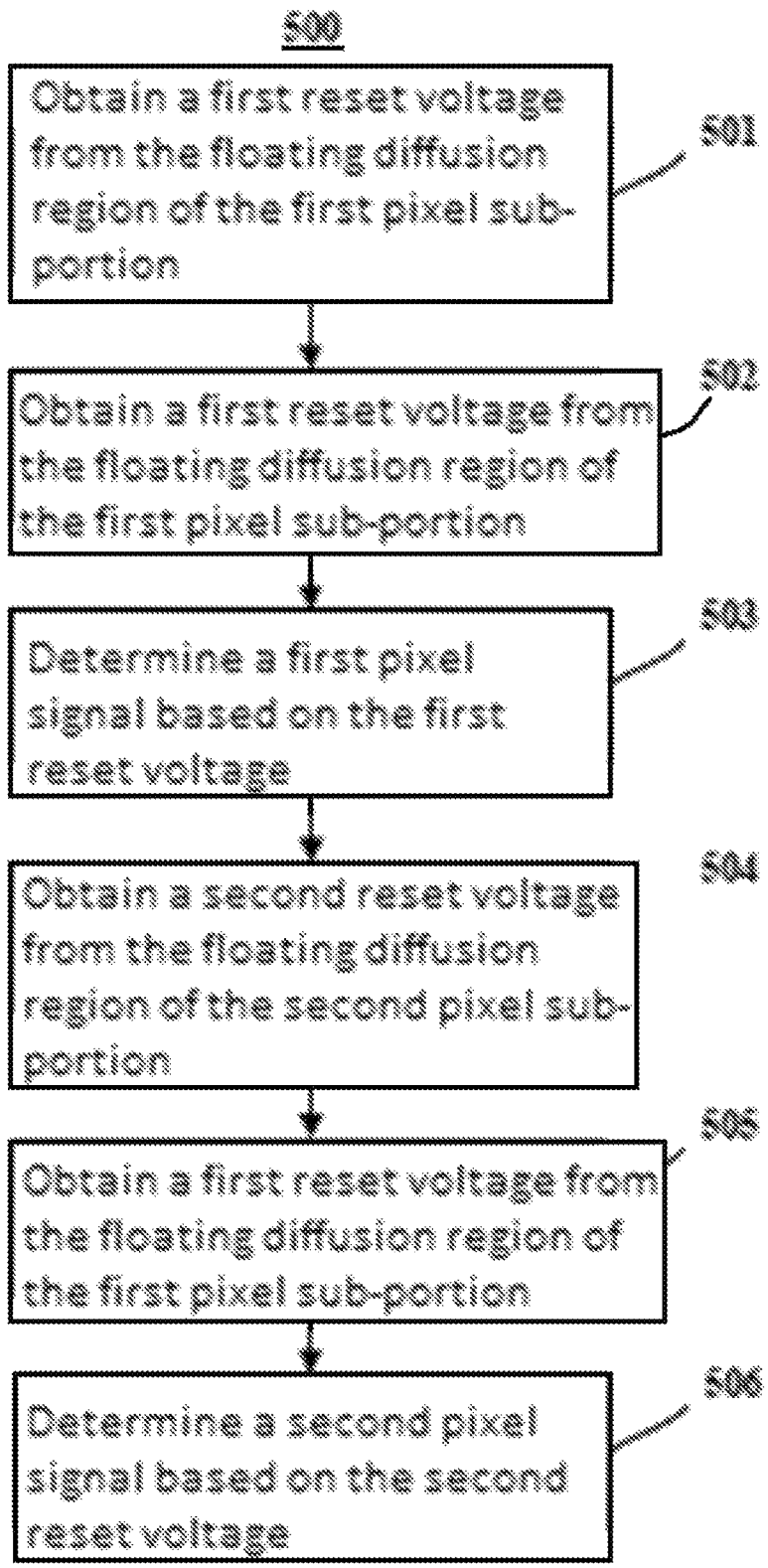
FIG. 5 is a schematic diagram of a pixel unit circuit in accordance with the third embodiment of the present invention.

FIG. 5 is a flowing chart of an imaging method according to one embodiment of the present invention, which method can be implemented with the pixel unit as shown in FIG. 2. As shown in FIG. 5, the imaging method 500 comprises a step 510 for obtaining a first reset voltage from the floating diffusion of the first pixel sub-portion. In step 520, a first signal voltage from the floating diffusion of the first pixel sub-portion is obtained. In step 530, a first pixel signal is determined based on the first reset voltage. In step 540, a second reset voltage from the floating diffusion of the second pixel sub-portion is obtained. In step 550, a second signal voltage from the floating diffusion of the second pixel sub-portion is obtained. In step $60, a second pixel signal is determined based on the second reset voltage.

According to one example in the first group of embodiments, the output pixel of the first pixel sub-portion and second pixel sub-portion are coupled to the same column A/D conversion unit.

The Second Group of Embodiments

In the second group of embodiments, the term "photoelectric conversion branch" is intended to include a photodiode and a transfer transistor, wherein the transfer transistor transfers charges of the photodiode generated. in response to incident light during an exposure period and accumulated in the photodiode during the exposure period to a charges receiver, such as a floating diffusion. In the second group of embodiments, there is proposed a pixel unit comprising a first pixel sub-portion and a second pixel sub-portion for half row reading, the first pixel sub-portion and the second pixel sub-portion each comprise: at least one photoelectric conversion branch, wherein each of the photoelectric conversion branches comprises: a photodiode: and a transfer transistor which is coupled to a floating diffusion and is controlled to transfer the charges of the photodiode generated in response to incident light during an exposure period and accumulated in the photodiode during said exposure period to the floating diffusion; a capacitor, the first end of which is coupled to a specified voltage: a gain control transistor coupled between the second end of the capacitor and the floating diffusion for imposing an isolation control between the capacitor and the floating diffusion; a reset transistor coupled to a capacitor and the gain control transistor for resetting the voltages of the capacitor and the coupling point of the gain control transistor by controlling a signal; and a source-follower transistor coupled to the floating diffusion for amplifying and outputting the signals of the floating diffusion.

In the pixel unit of the second group of embodiments, the first pixel sub-portions and the second pixel sub-portions each for half row reading further comprise row select transistors, which are respectively coupled to the output ends of the source follower transistors of the first pixel sub-portions and the second pixel sub-portions to select control the row of the output pixels via the same row select control signals.

In the pixel unit of the second group of embodiments, the gain control transistor changes the capacitance of the floating diffusion by controlling whether the capacitors are coupled to the floating diffusion. In the pixel unit as described above, the reset transistor of the first transistor and the reset transistor of the second transistor share the same reset control signal. In the pixel unit of the second group of embodiments, wherein the specified voltage coupled to the first end of the capacitor is a fixed voltage or a variable voltage. In the pixel unit as described above, the capacitor is a device capacitor or a parasitic capacitor to ground created at the connection point between the reset transistor and the gain control transistor.

According to the second group of embodiments of the present invention, there is proposed an imaging apparatus, comprising: an array of pixels, comprising a plurality of pixel units arranged in rows and columns, wherein each of the pixel units comprises a first pixel sub-portion and a second pixel sub-portion for half row reading, the first pixel sub-portion and the second pixel sub-portion each comprise' one or more photodiodes: one or more transfer transistors respectively coupled to the floating diffusion for transferring the charges generated by the one or more photodiodes during photodiode exposure to the floating diffusion; a capacitor, the first end of which is coupled to a specified voltage; a gain control transistor coupled between the capacitor and the floating diffusion for imposing an isolation control between the capacitor and the floating diffusion; a reset transistor coupled to a capacitor and the gain control transistor for resetting the voltages of the capacitor and the coupling point of the gain control transistor by controlling a signal; a source-follower transistor coupled to the floating diffusion for amplifying and outputting the signals of the floating diffusion; and a peripheral circuit for controlling the pixel array, and receiving and processing the image signals output by the pixel array output.

In the imaging apparatus of the second group of embodiments, the gain control transistor changes the capacitance of the floating diffusion by controlling whether the capacitors are coupled to the floating diffusion. In the imaging apparatus of the second group of embodiments, the first pixel sub-portions and the second pixel sub-portions for half row reading each further comprise row select transistors, which are coupled to the output ends of the source follower transistors to control the row of the output pixels via the row select control signals. In the imaging apparatus as described above, the row select transistors of the first pixel sub-portions and the row select transistors of the second pixel sub-portions share the same row select control signal, In the imaging apparatus of the second group of embodiments, the peripheral circuit comprises a column A/D conversion unit, and the output pixel signals of the first pixel sub-portions and the second pixel sub-portions are coupled to the same column A/D conversion unit.

In the imaging apparatus of the second group of embodiments, the reset transistor of the first pixel sub-portions and the reset transistor of the second pixel sub-portions share the same reset control signals. In the imaging apparatus as described above, the specified voltage coupled to the first end of the capacitor is a fixed voltage or a variable voltage. In the imaging apparatus as described above, the capacitor is a device capacitor or a parasitic capacitor to ground created at the connection point between the reset transistor and the gain control transistor.

According to the second group of embodiments of the present invention, there is proposed an imaging method in the above described pixel, comprising: obtaining a first reset voltage of the floating diffusion in a first conversion gain mode; obtaining a second reset voltage of the floating diffusion in a second conversion gain mode; obtaining a second signal voltage of the floating diffusion in the second conversion gain mode; obtaining a first signal voltage of the floating diffusion in the first conversion gain mode; and obtaining a first valid signal through a dual-correlation operation based on the first reset voltage and the first signal voltage; obtaining a second valid signal through a dual-correlation operation based on the second reset voltage and the second signal voltage. In the method as described above, wherein the first signal voltage and the second signal voltage may come from the same photodiode.

According to the second group of embodiments of the present invention, the gain control transistor effectively isolates the capacitor and the floating diffusion. A greater ratio of high conversion gain/low conversion can be achieved increasing the capacitance value, thereby obtaining a greater dynamic range. The technical solution of the present invention allows a relatively small parasitic capacitance of the floating diffusion, a relatively larger high conversion gain, and an effectively improved noise performance of the circuit.

Figure 6A:
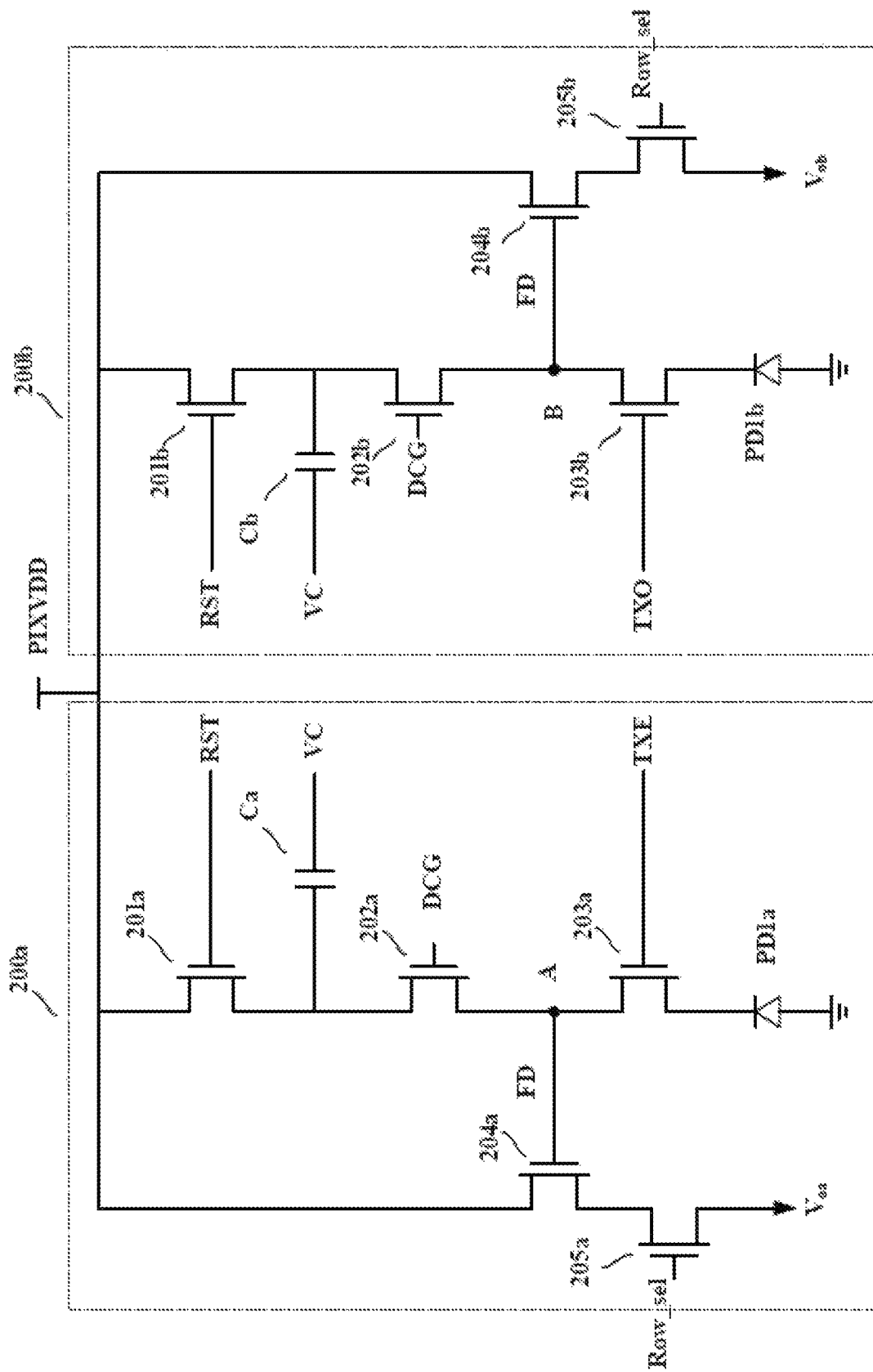
FIG. 6a is a schematic diagram of a pixel unit according to an embodiment of the present invention.

FIG. 6a is a schematic diagram of a pixel unit according to the second group of embodiments. Pixel 200 in FIG. 6a comprises a first pixel sub-portion 200a and a second pixel sub-portion 200b for half row reading having the same circuit structure, located respectively in even column and odd column. The first pixel sub-portion 200a located in even column will be described below.

As shown in FIG. 6a, the first pixel sub-portion 200a located in even column comprises (or consists of) a reset transistor 201a, a gain controlling transistor 202a, a transfer transistor 203a, a photodiode PD1a, a source follower transistor 204a, a row select transistor 205a, and a capacitor Ca (or parasitic capacitors, not limited to capacitance devices). The photodiode PD1a is connected to the source of the transfer transistor 203a. The gate of the transfer transistor 203a may be coupled a signal TXE control, so that the transfer transistor 203a may be responsive to signal TXE When TXE control the transfer transistor to an "on" state, the charges generated in response to incident light during an exposure period and accumulated in the photodiode during said exposure period are transferred to the floating diffusion FD. The gate of the source follower transistor 204a is connected to the floating diffusion FD, so that the output voltage of the source follower transistor is substantially the same as the voltage of the floating diffusion FD 204 (i.e., the voltage at node A). The source of the source follower transistor 204a is directly or indirectly coupled to the output Voa. The gain control transistor 202a is coupled between the source of the reset transistor 201a and the transfer transistor 203a, and one end of a capacitor Ca is coupled between the reset transistor 201a and the gain control transistor 202a, and the other end is coupled to a level VC. It will be appreciated that the level VC can be a certain fixed level (e.g., ground or other voltage) or a controllable changing level. The reset transistor 201a is controlled by signal RST to reset the floating diffusion FD. Further, the first pixel sub-portion 200a comprises a row select transistor 205a, which is connected to an output end of the source follower transistor 204a. The row select transistor 205a couple the signals from the source follower transistor 204a to an A/D conversion circuit through the control of a row select control signal Row_sel.

In the second group of embodiments, the structure of the second pixel, sub-portion 200b located in odd column is similar to the first pixel sub-portion 200a, and thus the description thereof is omitted. According to one embodiment of the present invention, the respective reset transistors 201a and 201b of the first pixel sub-portion 200a and the second pixel sub-portion 200b may share the same reset control signal. The respective row select transistors 205a and 205b in the first pixel sub-portion 200a and the second pixel sub-portion 200b may selectively control the pixel output via the same row selection control signal Row_sel.

Based on the above structure and taking the first pixel sub-portion 200a for example, one can adjust the capacitance Cfd of the floating diffusion FD and the conversion gain CG by controlling the switching of the gain control transistor 202a.

When the signal DCG is at a high level, the gain control transistor 202a is at on state, so that the capacitor Ca is paralleled to the floating diffusion FD. With respect to the floating diffusion FD, the total equivalent capacitance Cfd thereof is the accumulation of the capacitor Ca and the original capacitance Cfd of the floating diffusion FD: C$\underline{fd}$=Ca+Cfd.

Thus, by increasing the capacitor Ca, the overall charge storage ability of the floating diffusion FD is improved, so that the pixels 200 have a higher full well capacity and thus the imaging apparatus has a wider light dynamic range. The capacitor Ca is a device capacitor or a parasitic capacitor to ground created at the connection point between the reset transistor 201a and the gain control transistor 202a.

When the signal DCG is at a low level, the gain control transistor 202a is at off state, so that the capacitor Ca is isolated from the floating diffusion FD. The total capacitance Cfd at the floating diffusion FD reduces to original capacitance Cfd of the floating diffusion FD.

Conversion gain CG is calculated by the formula $$CG=q/C\underline{fd}=(Cfd+Ca)(uV/e) \qquad (1)$$

wherein q is the amount of charges in the floating diffusion, and uV/e represents the unit of the CG.

As can be seen from the above formula, the addition of the capacitor Ca decreases the conversion gain CG of the pixel 200. Correspondingly, the disconnection between the capacitor Ca and the floating diffusion FD increases the conversion gain. Thus, one can control the pixel 200 to switch between high and low conversion gain modes by controlling the on-off of the gain control transistor 202a.

In addition, the ratio of the HCG/LCG can be obtained from the formula (1) as follows:

$$HCG/LCG=(Cfd+Ca)/Cfd \qquad (2)$$

It can be found from the above embodiment that the gain control transistor 202a of the present invention can efficiently improve the signal to noise ratio (SNR) of the pixels in the imaging apparatus and the light dynamic range. With the isolation between the capacitor Ca and the floating diffusion FD through the gain control transistor 202a, one can increase Ca to achieve a greater ratio of HCG/LCG, so as to have a larger dynamic range.

According to the second group of embodiments, a capacitor Ca can be formed by a variety of ways. One way is a parasitic capacitor to ground created at the connection point between the reset transistor and the gain control transistor, which parasitic capacitor can become the capacitor Ca. According to another embodiment, a device capacitor Ca is used, and the capacitor is connected to VC with a controllable voltage, i.e. the manner as shown in FIG. 6a.

Further, as shown in FIG. 6a, there is no additional device at the FD point. Thus, the parasitic capacitor at the FD point is relatively small, i.e. the conversion gain (CG) at HCG (DCG tube is off) is relatively high. Thus, not only the noise performance is good, but also the ratio of HCG to LCG (DCG tube is on) at the same Cdcg condition is relatively high, thereby further increasing the dynamic range. In addition, there will be more flexibility on the selection of the connected potential of the other end of capacitor Ca in the circuit of FIG. 6a. More importantly, the value of the capacitor Ca may not be limited by the driving ability of the control signal DCG. Because of the direct connection with the RST reset tube having a stronger driving ability (connecting power supply lines), and the isolation between the DCG tube and the FD point, the value of Ca can be larger, i.e. LCG can be smaller, thereby relatively increasing the dynamic range further.

As one of the important embodiments of the present invention, the additional gain control transistor 202a and the capacitor Ca can have the same production steps with other transistors. Therefore, both the manufacture cost and the process difficulty will not be increased.

For the pixel 200 as shown in FIG. 6a, outputs Voa and Vob may share one A/D conversion circuit, When the even column is selected for reading, Voa is gated to the A/D conversion circuit; and when the odd column is read, Vob is gated to the A/D conversion circuit. When the even column is selected for reading, Voa is gated to the A/D conversion circuit, the signal of the photodiode PD1a of the first pixel sub-portion 200a at the even column is read by controlling the transfer signal TXE. The reading process of a photodiode signal is illustrated below by an example of TXE controlled PD1a.

Figure 6B:
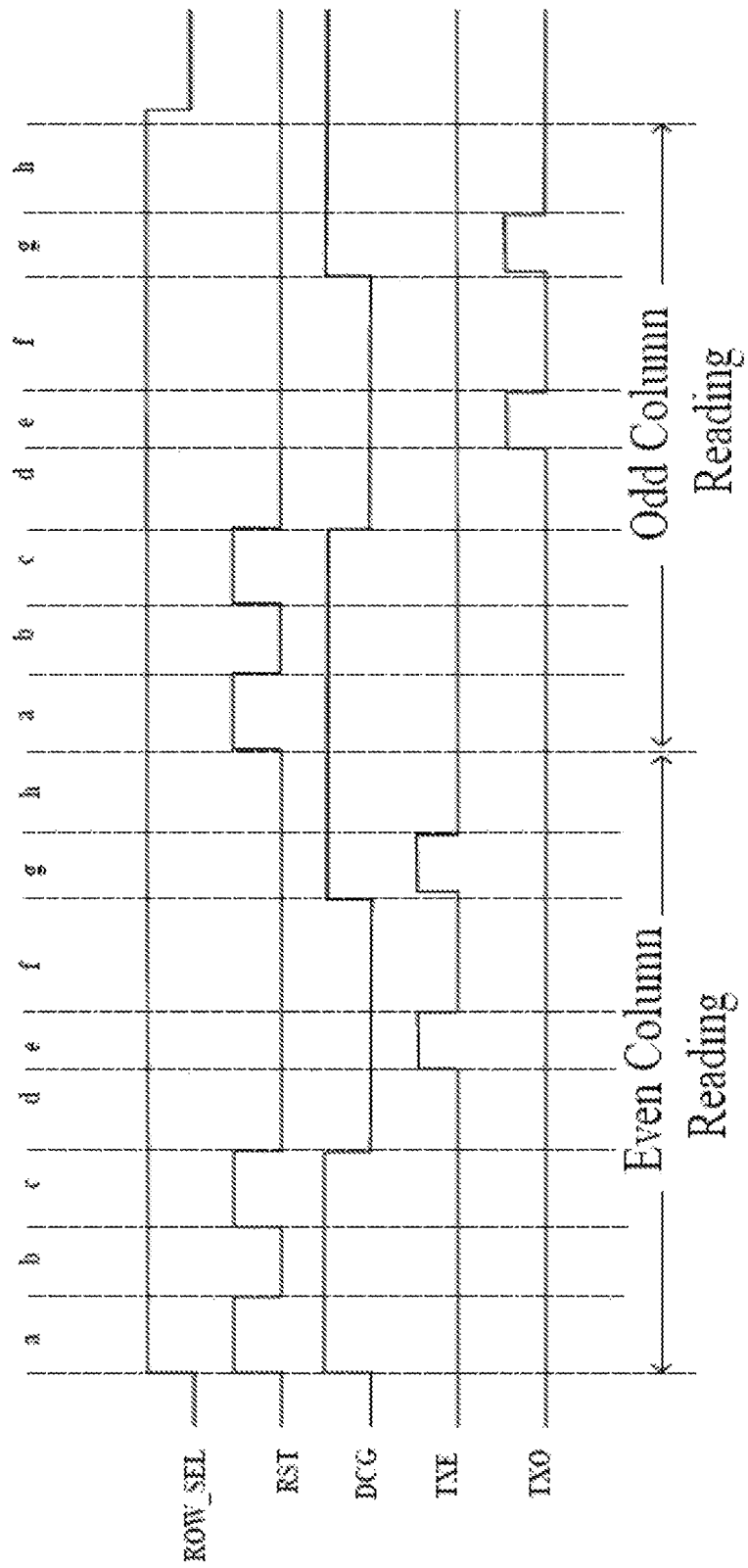
FIG. 6b is a timing diagram of the reading process of the pixel unit according to an embodiment of the present invention.

FIG. 6b is a control timing diagram of the reading process of the photodiode signal according to the second group of embodiments. First, the column signal ROW_SEL is placed at a high level, enabling the reading process of the pixel 200.

Interval a: In this interval, signal RST and signal DCG are placed at high levels, the reset transistor 201a and 202a photocathode and the transistors are conducted at this time. Thus, the potential at node A will be reset to a high level PIXVDD.

Interval b: In this interval, the potential VL0 at the node A in a low conversion gain mode is read. Since signal RST is at a low level, while signal DCG is held at a high level, and the reset transistor 201a is off and the gain control transistor 202a is on, therefore, the total capacitance on the floating diffusion FD Cfd comprises the original capacitance of the floating diffusion FD Cfd and the capacitor Ca, so that the conversion gain mode becomes small.

Interval c: In this interval, signal RST is again at a high level, thus, both the reset transistor 201a and the gain control transistor 202a will be conducted, and the potential at node A will be reset to a high level PIXVDD.

Interval d: In this interval, the potential VH0 at node A in a high conversion gain mode is read. Since both signal RST and signal DCG are at low levels, the capacitor Ca cannot be electrically connected to the floating diffusion FD, therefore, the total capacitance on the floating diffusion FD Cfd will comprise the original capacitance of the floating diffusion FD Cfd only, so that the conversion gain becomes larger.

Interval e: In this interval, signal TXE is at a high level, thus the transfer transistor 203a is turned on, so that the electrons generated by the photodiode PD1a are transferred to the floating diffusion FD. Since both signals RST and DCG are at low levels, therefore, it is at a high conversion gain mode at this time.

Interval f: In this interval, signal TXE is at a low level, and the potential VH1 of the node A in a high conversion gain mode is read.

Interval g: In this interval, both signals DCG and TXE are at high levels, thus, the electrons generated by the photodiode PD1a are transferred to the floating diffusion FD.

Obviously, the total capacitance on the floating diffusion FD Cfd comprises the original capacitance of the floating diffusion FD Cfd and the capacitor Ca.

Interval h: In this interval, signal TXE is at a low level, and the potential VL1 of the node A in a low conversion gain mode is read.

Through the above processes, the reset voltages (VH0, VL0) and the signal voltages (VHL, VL1) at the node A in the high and low conversion gain modes are obtained. Similarly, the reset voltages and the signal voltages at the node B in the high and low conversion gain modes can be obtained by controlling signal TXO and repeating the above steps.

Since the above signals are all sampled in the same signal output period, when the interval between the two sampling times is less than the specified time threshold, the noise voltage of these two samples will be substantially the same. Since the sampling times are related, when the two sampling values are subtracted, the interference of the reset noise can be substantially eliminated, and the actual effective amplitude of the signal voltage in different conversion gain modes is obtained. For the pixels comprising a photodiode array, the embodiments proposed by the second group of embodiments are equally applicable.

Figure 7A:
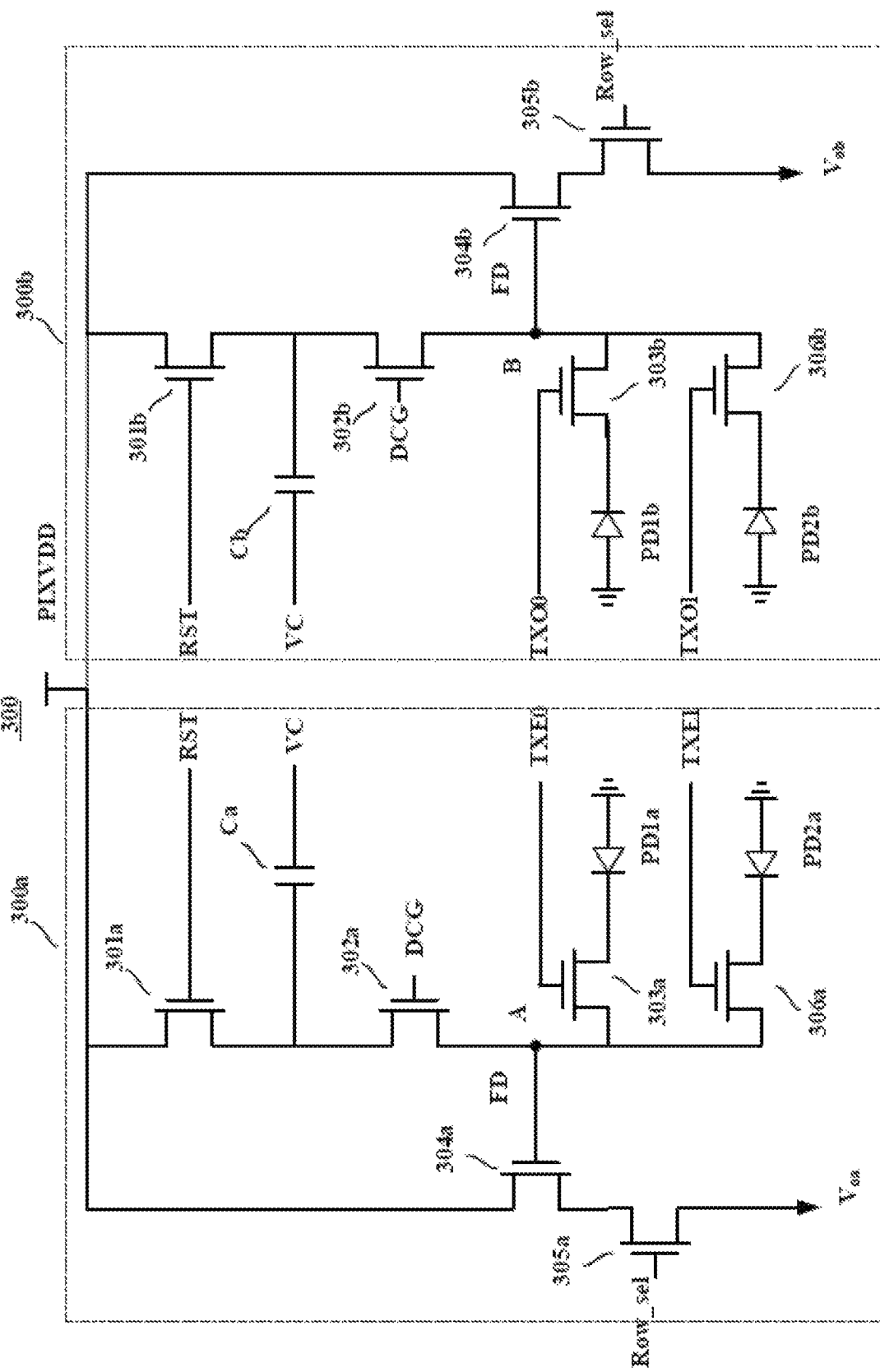
FIG. 7a is a schematic diagram of a pixel unit according to an embodiment of the present invention.

FIG. 7a is a schematic diagram of a pixel unit according to the second group of embodiments. Pixel 300 comprises a first pixel sub-portion 300a and a second pixel sub-portion 300b for half row reading having the same circuit structure, located respectively in even column and odd column.

The gates of transfer transistors 303a and 306a couple signals TXE0 and TXE1, respectively. When TXE0 or TXE1 controls the corresponding transfer transistor to be in the "on" state, the charges in the photodiode generated in response to incident light during an exposure period and accumulated in the photodiode during said exposure period are transferred to the floating diffusion FD. The gate of the source follower transistor 204 is connected to the floating diffusion FD such that the output voltage of the source follower transistor 304a is substantially the same as the voltage of the floating diffusion FD (i.e., the voltage at the node A). The source of the source follower transistor 304a is coupled directly or indirectly to the output Voa. Gain control transistor 302a is coupled between the source of reset transistor 301a and transfer transistor 303a/306a, and one end of the capacitor Ca is coupled between the reset transistor 301a and the gain control transistor 302a, and the other end is coupled to a level VC. It will be appreciated that for the level VC can be a fixed level (e.g., ground or other voltage) or a controllable changing level, the reset transistor 206a is controlled by the signal RST to reset the floating diffusion FD.

As can be seen from the above, and as compared with the pixel unit in FIG. 6a, the first pixel sub-portion 300a in this embodiment includes two photoelectric conversion branches, i.e., a first photoelectric conversion branch (switching transistor 303a and photodiode PD1a) and a second photoelectric conversion branch (switching transistor 306a and photodiode PD2a). In addition, the output Vob and Voa of the pixel 300 respectively corresponds to one A/D conversion circuit. In other words, when the pixel sub-portion includes at least two photoelectric conversion branches, the output ends Voa, Vob of the two pixel sub-portions are isolated from each other. Based on the configuration, it is possible to read the odd column and the even column simultaneously. Alternatively, for the pixel 300, output Voa and Vob may share one A/D conversion circuit, Voa strobes to the A/D conversion circuit when an even column read is selected, and Vob strobes to the A/D conversion circuit when an odd column read is selected. This method can reduce the A/D conversion circuit by half, greatly reducing the chip area and power consumption.

FIG. 7b is a schematic diagram of the arrangement or configuration of the FIG. 7a photodiode of the second group of embodiments. As shown in the figure, the two photodiodes (e.g., PD1a and PD2a) in a pixel sub-portion (e.g. the first sub-portion 300) are arranged in a pattern of 1×2.

Figure 7C:
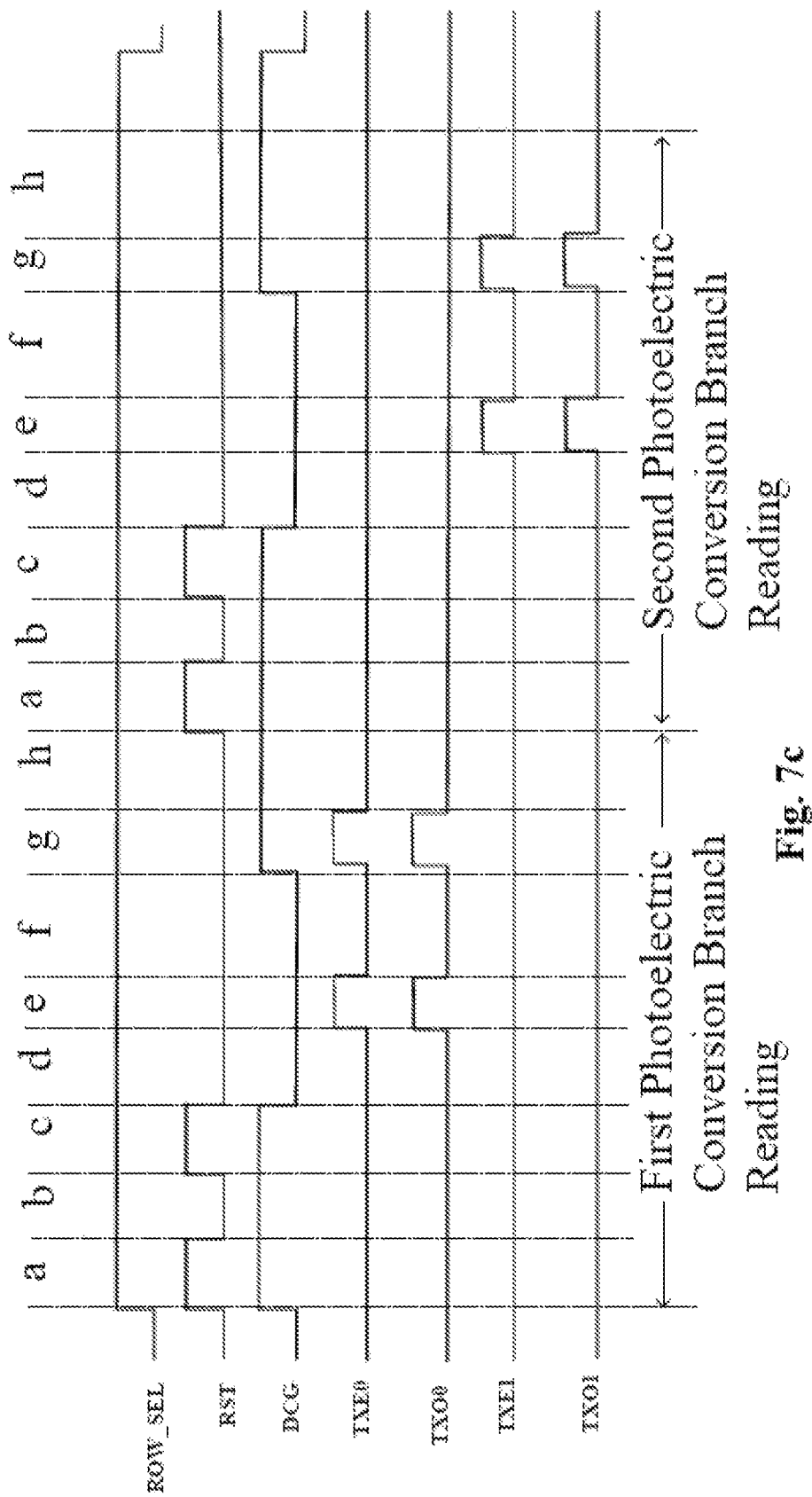
FIG. 7c is a timing diagram of the reading process of the pixel unit according to an embodiment of the present invention.

FIG. 7c is a timing diagram of the reading process of the FIG. 7a pixel unit according to the second group of embodiments. As can be seen from the figure, under the control of the signals TXE1 TXE0, the signal voltages generated in the high and low conversion gain modes of the first photoelectric conversion branch and the second photoelectric conversion branch in the first pixel sub-portion 300a (i.e., the voltage at node A) will be read, respectively. Likewise, under the control of the signals TXO1 and TXO0, the signal voltages generated in the high and low conversion gain modes of the first photoelectric conversion branch and the second photoelectric conversion branch in the first pixel sub-portion 300b (i.e., the voltage at node B) will be obtained.

Since the outputs Voa and Vob of the pixel 300 respectively correspond to one A/D conversion circuit, TXE0 and TXO0 can simultaneously control the conversion branches in the even columns and the odd columns to simultaneously read the even columns and the odd columns. After obtaining the signal voltage and the reset voltage corresponding to the nodes A and B, the actual effective amplitude of the signal level corresponding to each conversion branch can be determined. In addition, as shown in the timing diagram, the signals TXE and TXO have the same timing. Thus, the first photoelectric conversion branch in the first pixel sub-portion 300a and the first photoelectric conversion branch in the second pixel sub-portion 300b may share the conversion control signal as a pair. In other words, by controlling the transfer signals TXEI and TXE0, it is possible to simultaneously read the signals of the photo diode signals in the even columns and the odd columns.

Figure 8:
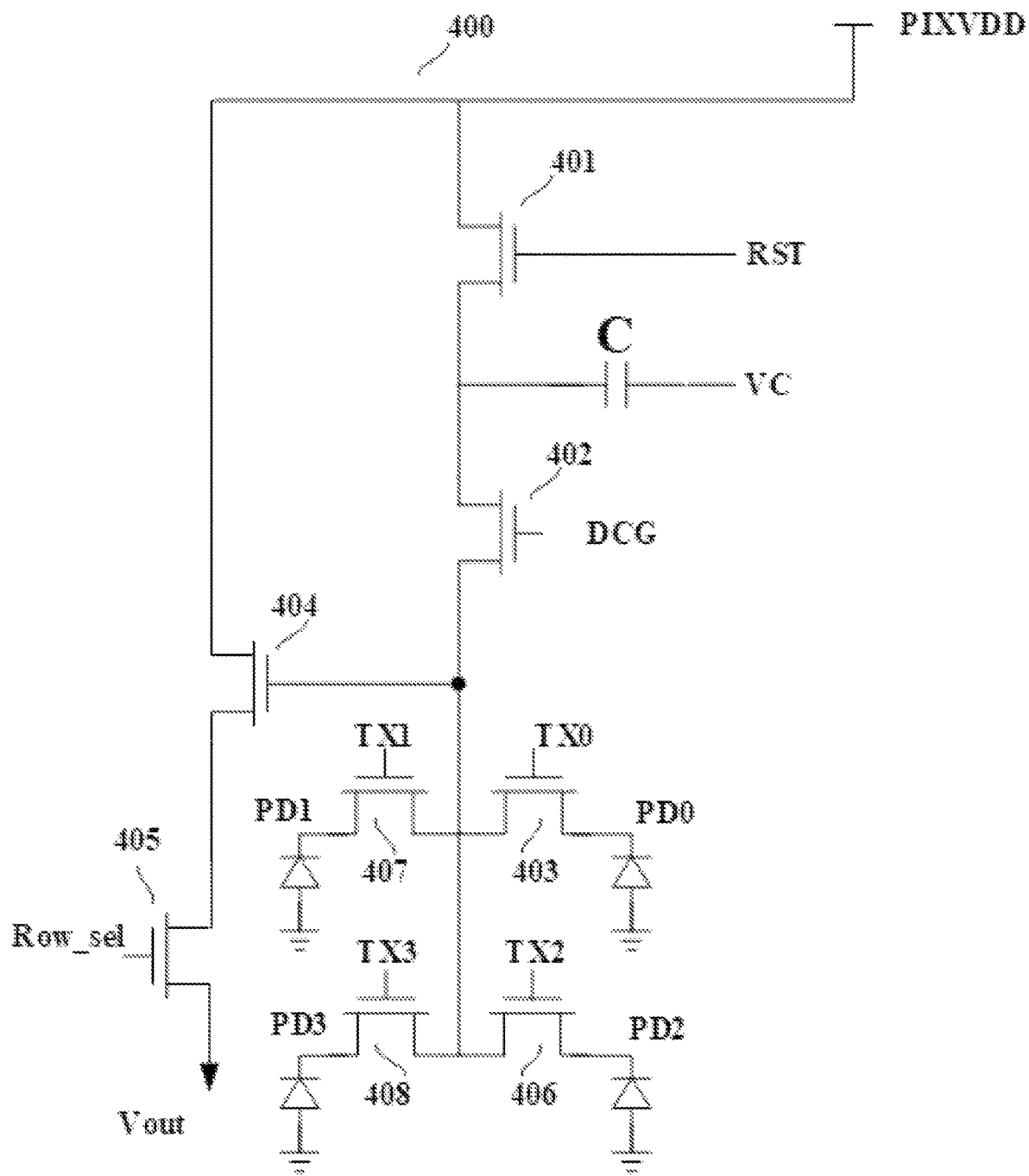
FIG. 8 is a schematic diagram of a pixel unit according to an embodiment of the present invention.

FIG. 8 is a schematic diagram of a pixel unit according to an embodiment of the present invention. Similar to FIG. 7a, the pixel unit in FIG. 8 includes (or consists of) a reset transistor 401, a gain control transistor 402, a source follower transistor 404, a row select transistor 405, and a capacitor (or a parasitic capacitor, not limited to capacitance devices) coupled to a level VC, However, unlike the pixel 300 as shown in FIG. 7a that includes the first pixel sub-portion 300a and the second pixel sub-portion 300b, the pixel unit in FIG. 8 includes four photoelectric conversion branches configured or arranged in a 2×2 array for half row reading, and does not have the pixel sub-portions as shown in FIG. 7a. The four photoelectric conversion branches share a same floating diffusion.

Referring to FIG. 8 for more details, the first photoelectric conversion branch comprises a first conversion (or transfer) transistor 403 and a first photodiode PD0. The second photoelectric conversion branch comprises a second conversion transistor 407 and a second photodiode PD1. The third conversion branch comprises a third conversion transistor and a third photodiode PD2. The fourth conversion branch comprises a fourth conversion transistor 408 and a photodiode PD3. The outputs Vout of the pixel 400 corresponds to one A/D conversion circuit. In an embodiment, photodiodes PD0 and PD2 read odd column, and photodiodes PD1 and PD3 read even column. In a pixel row reading, the branch of PD0 and TX0 reads the even column of a row, while the branch of PD1 and TX1 reads the odd column of a row.

Figure 9:
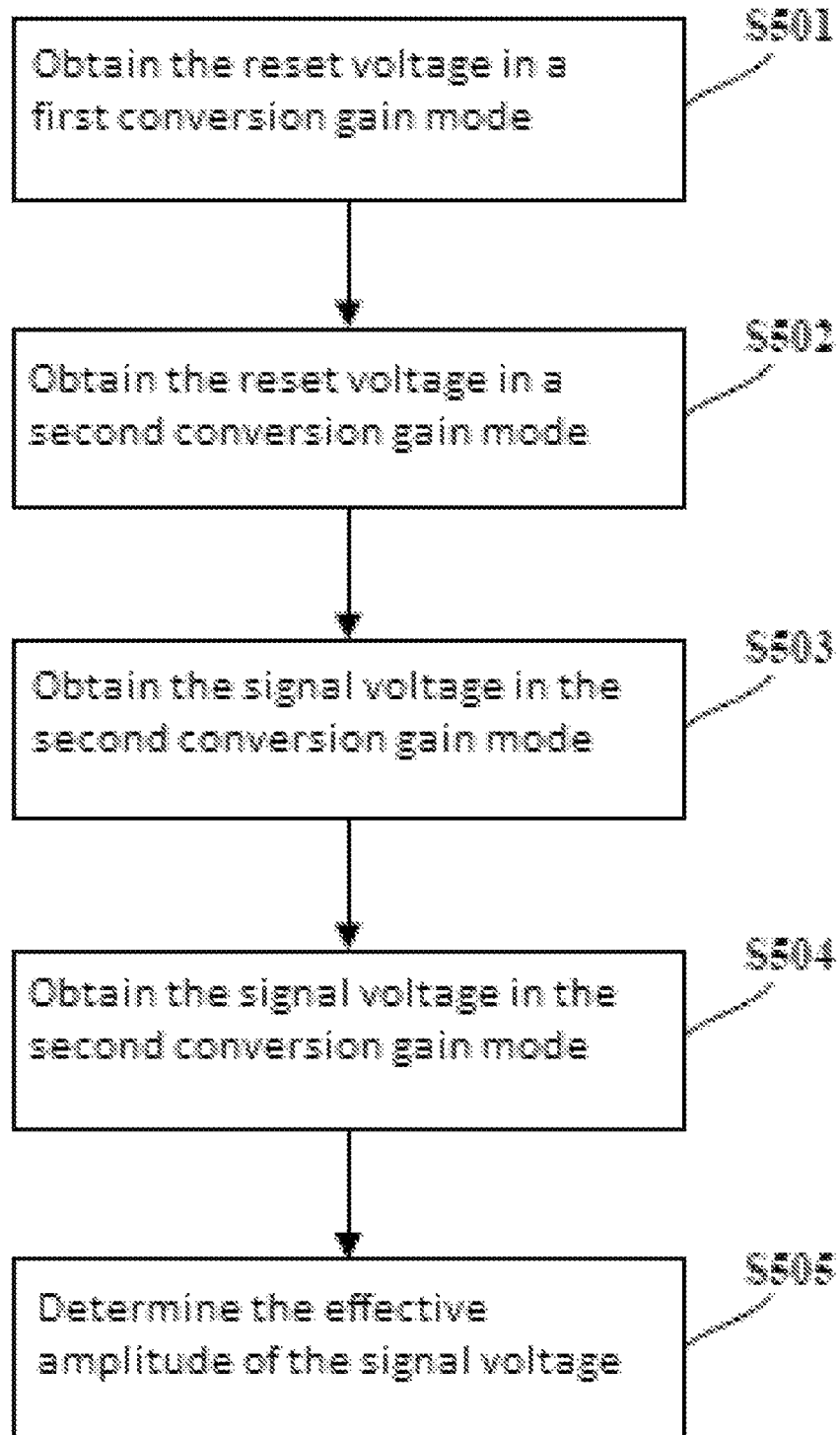
FIG. 9 is a flow diagram of an imaging method according to an embodiment of the present invention.

FIG. 9 is a flow chart of an imaging method according to an embodiment of the present invention. The reading process of the first sub-portion pixel in the first group of embodiments is taken as an example.

Step S501: the reset voltage of a first conversion gain mode is obtained. In this step, the gain control transistor is turned on so that the pixel circuit is in the first conversion gain mode; the first reset voltage of the floating diffusion FD is read.

Step S502: the reset voltage of a second conversion gain mode is obtained. In this step, the gain control transistors are turned off, so that the pixel circuit is in the second conversion gain mode, and the second reset voltage of the floating diffusion is read.

Step S503: the signal voltage in the second conversion gain mode is obtained. In this step, the electrons generated by photodiodes in the photoelectric conversion branch are transferred to the floating diffusion FD. It will be appreciated that the voltage at the floating diffusion FD at this time is determined by the electrons actually generated by the photodiode, the noise at the floating diffusion FD, and the equivalent capacitance of the floating diffusion FD to the ground.

Step S504: the signal voltage of the first conversion gain mode is obtained. In this step, the gain control transistor is turned on, the voltage at the floating diffusion FD is determined by the electrons actually generated by the photodiode, the noise at the floating diffusion FD, the equivalent capacitance of the floating diffusion FD to the ground and the capacitor Ca.

Step S505: the effective amplitude of the signal voltage is determined by a dual-correlation operation. The reset voltages and signal voltages at different conversion gain modes can be obtained through steps S501-S504. Based on the obtained reset voltages and signal voltages, signal voltage values at different conversion gain modes can be determined through the dual-correlation operation, thus eliminating the influence of noise voltages.

In an example within the second group of embodiments, the process of reading and controlling the second sub-portion pixel are the same as those of the first sub-portion and are not described separately.

The first conversion gain mode and the second conversion gain mode described above are not required to be switched by a user-specified threshold. Obtaining signal voltages at two different gains per read, large dynamic range images are obtained through software processing without increasing hardware costs, which is well suited for use in cell phones and camera equipment for security and on-board applications.

Figure 10:
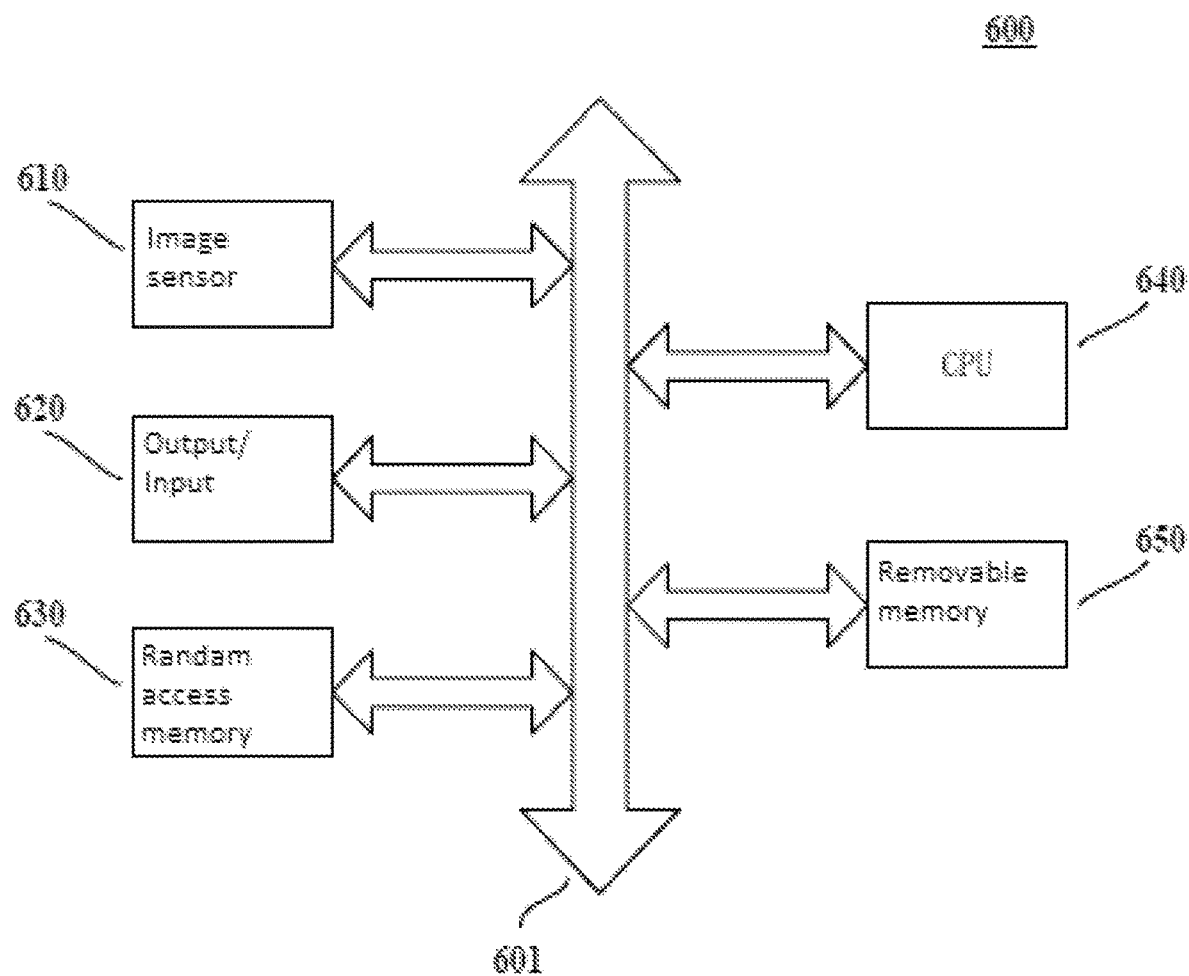
FIG. 10 is a schematic diagram of a system in accordance with one embodiment of the present invention.

FIG. 10 is a schematic diagram of a system according to one embodiment the present invention. FIG. 10 illustrates a processing system 600 comprising an image sensor 610, wherein the image sensor 610 is the image sensor as described in the first and second groups of embodiments of the present invention. The exemplified processing system 600 may comprise a digital circuit system of an image sensor device. Without any limitations, such a system could comprise a computer system, a camera system, a scanner, a machine vision, a vehicle navigator, a video phone, a surveillance system, an automatic focusing system, a star tracker system, a motion detection system, an image stabilization system and a data compression system.

The processing system 600 (e.g., a camera system) typically comprises a central processing unit (CPU) 640 (e.g., a microprocessor), which communicates with the input/output (I/O) device 620 via bus 601. Image sensor 610 also communicates with CPU 640 via bus 601. The processor based system 600 also comprises a random access memory (RAM) 630, and may comprise a removable memory 650 (e.g., a flash memory), which also communicates with the CPU 640 via the bus 601. The image sensor 610 may be combined with a processor (e.g., a CPU, a digital signal processor or a microprocessor), a single integrated circuit or a chip that is different from the processor may or may not have a memory storage device. The image combining and processing calculation can be performed by the image sensor 610 or the CPU 640.

Finally, it should be explained that, the above embodiments are only used for explaining the technical solution of present invention, and not for limitation thereto. Although the present invention has been explained in details with reference to the preferred embodiments, it should be understood by those skilled in the art that modifications and equivalent alternations can be made to the technical solution of present invention, and these modifications and equivalent alternations cannot depart the modified technical solution from the spirit and scope of the technical solution of present invention.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A pixel unit comprising a first pixel sub-portion and a second pixel sub-portion for half row reading, the first pixel sub-portion and second pixel sub-portion each separately and independently comprising:
   one or more photodiodes;
   one or more transfer transistors each coupled to a floating diffusion, for transferring the charges generated by the one or more photodiodes in response to incident light during an exposure period and accumulated in the photodiodes during said exposure period respectively to the floating diffusion;
   a reset transistor;
   a source follower transistor coupled to the floating diffusion for amplifying and outputting the pixel signal of the floating diffusion;
   wherein (1) one of said photodiodes and (2) one of said transfer transistors that transfers charges of the one of said photodiodes generated in response to incident light during an exposure period and accumulated in the one of said photodiodes during the exposure period to the floating diffusion constitute a photoelectric conversion branch;
   wherein the first pixel sub-portion and the second pixel sub-portion each comprises at least one photoelectric conversion branch;
   wherein the pixel unit further comprises a capacitor and a gain control transistor, wherein a first end of the capacitor is coupled to a specified voltage;
   wherein the gain control transistor is coupled between a second end of the capacitor and the floating diffusion for imposing an isolation control between the capacitor and the floating diffusion;
   wherein the reset transistor is coupled to the capacitor and the gain control transistor for resetting the voltages of the capacitor and a coupling point with the gain control transistor by controlling a signal; and
   wherein the reset transistor is not directly coupled to the floating diffusion.

2. The pixel unit according to claim 1, wherein the gain control transistor changes the capacitance of the floating diffusion by controlling whether the capacitors are coupled to the floating diffusion.

3. The pixel unit according to claim 1, wherein the reset transistor of the first transistor and the reset transistor of the second transistor share the same reset control signal.

4. The pixel unit according to claim 1, wherein the specified voltage coupled to the first end of the capacitor is a fixed voltage or a variable voltage.

5. The pixel unit according to claim 1, wherein the capacitor is a device capacitor or a parasitic capacitor to ground created at the connection point between the reset transistor and the gain control transistor.

6. An imaging apparatus comprising a pixel array that comprises a plurality of pixel units according to claim 1 arranged in rows and columns, each pixel unit comprising:
   four photoelectric conversion branches for half row reading, wherein each of the photoelectric conversion branches comprises:
   a photodiode; and
   a transfer transistor;
   wherein ail the four transfer transistors are coupled to a same floating diffusion and are controlled to transfer the charges of the four photodiodes generated in response to incident light during an exposure period and accumulated in the photodiode during said exposure period to the floating diffusion;
   a capacitor, a first end of which is coupled to a specified voltage:
   a gain control transistor coupled between a second end of the capacitor and the floating
diffusion for imposing an isolation control between the capacitor and the floating diffusion;
   a reset transistor coupled to a capacitor and the gain control transistor for resetting the voltages of the capacitor and the coupling point of the gain control transistor by controlling a signal; and
   a source-follower transistor coupled to the floating diffusion for amplifying and outputting the signals of the floating diffusion.

7. The imaging apparatus according to claim 6, further comprising a control circuit for controlling the pixel array, wherein the first pixel sub-portion and second pixel sub-portion further each comprises a row select transistor, which controls the pixel row output via a row select control signal.

8. The imaging apparatus according to claim 7, wherein the row select transistor of the first pixel sub-portion and the row select transistor of the second pixel sub-portion share the same row select control signal.

9. The imaging apparatus according to claim 7, wherein the control circuit comprises a column A/D conversion unit, and the output pixels from the first pixel sub-portion and second pixel sub-portion are coupled to the same column A/D conversion unit.

10. The imaging apparatus according to claim 7, wherein the reset transistor of the first pixel sub-portion and second pixel sub-portion share the same reset control signal.

11. The imaging apparatus according to claim 6, further comprising a peripheral circuit for controlling the pixel array, and receiving and processing the image signals output by the pixel array output, wherein the plurality of pixel units are pixel units according to claim 1.

12. The imaging apparatus according to claim 11, wherein the gain control transistor changes the capacitance of the floating diffusion by controlling whether the capacitors are coupled to the floating diffusion.

13. The imaging apparatus according to claim 11, wherein the first pixel sub-portions and the second pixel sub-portions each further comprise row select transistors, which are respectively coupled to the output ends of the source follower transistors to control the row of the output pixels via the row select control signals.

14. The imaging apparatus according to claim 13, wherein the row select transistors of the first pixel sub-portions and the row select transistors of the second pixel sub-portions share the same row select control signal.

15. The imaging apparatus according to claim 11, wherein the peripheral circuit comprises a column A/D conversion unit, and the output pixel signals of the first pixel sub-portions and the second pixel sub-portions are coupled to the same column A/D conversion unit.

16. The imaging apparatus according to claim 11, wherein the reset transistor of the first pixel sub-portions and the reset transistor of the second pixel sub-portions share the same reset control signal.

17. The imaging apparatus according to claim 11, wherein the specified voltage coupled to the first end of the capacitor is a fixed voltage or a variable voltage.

18. The imaging apparatus according to claim 11, wherein the capacitor is a device capacitor or a parasitic capacitor to ground created at the connection point between the reset transistor and the gain control transistor.

* * * * *